United States Patent [19]

Buldini

[11] 4,249,818

[45] Feb. 10, 1981

[54] CASSETTE RECEIVING APPARATUS FOR USE WITH LARGE FORMAT FILM PROCESSOR

[75] Inventor: Daniel A. Buldini, Melrose, Mass.

[73] Assignee: Polaroid Corporation, Cambridge, Mass.

[21] Appl. No.: 108,453

[22] Filed: Dec. 31, 1979

[51] Int. Cl.³ ........................ G03D 9/02; G03B 41/18

[52] U.S. Cl. .................................... 354/312; 354/276; 354/304; 250/468

[58] Field of Search ...................... 354/86, 87, 88, 304, 354/312, 313, 314, 276, 297, 277; 250/468, 470

[56] References Cited

U.S. PATENT DOCUMENTS

| | | | |
|---|---|---|---|
| 3,842,282 | 10/1974 | Shimoda et al. | 250/468 |
| 3,891,854 | 6/1975 | Hura | 250/468 |
| 3,900,405 | 8/1975 | Bartlett et al. | 250/468 |
| 3,934,735 | 1/1976 | Schmidt | 250/468 |
| 4,019,194 | 4/1977 | Cutler | 354/312 |
| 4,156,568 | 5/1979 | Erikson | 354/312 |
| 4,183,651 | 1/1980 | Mills | 354/304 |
| 4,186,308 | 6/1980 | Erikson | 354/276 |
| 4,200,384 | 4/1980 | Josephson et al. | 354/304 |

*Primary Examiner*—L. T. Hix
*Assistant Examiner*—Alan Mathews
*Attorney, Agent, or Firm*—John S. Vale

[57] ABSTRACT

Photographic apparatus usable with a large format film processor for receiving and supporting a cassette holding an exposed film unit and for unlatching structure on the cassette to substantially reduce pressure on the film unit to facilitate its movement over a film bearing surface as the film unit is advanced from the cassette into the entry of the film processor. The cassette includes differently configured forward and rear pressure latch release members and the apparatus includes conforming forward and rear latch release actuators. The actuators are configured to allow the forward release member to pass by the rear actuator without causing premature actuation of the forward release member.

11 Claims, 13 Drawing Figures

CASSETTE RECEIVING APPARATUS FOR USE WITH LARGE FORMAT FILM PROCESSOR

BACKGROUND OF THE INVENTION

The present invention relates to the field of photography and, more specifically, to a photographic apparatus or adapter for use with a large format self-developing film processor for receiving a cassette holding an exposed film unit, for supporting the cassette an an operative position relative to a film entry on the processor and for releasing a latched pressure device on the cassette to substantially reduce pressure applied to the film unit and thereby facilitate its advancement from the cassette into the processor.

Certain types of self-developing film units, for example the large format (e.g. 8×10 or larger) type for conventional or X-ray photography, include separate image recording and image receiving sheets.

In use, the photosensitive image recording sheet is loaded into a cassette which is then mounted on a large format view camera or X-ray apparatus for film exposure. Thereafter the cassette is transferred to a receiving tray or adapter mounted on a film processor where the exposed sheet has its leading end coupled to the leading end of an underlying image receiving sheet located in the adapter. The coupled sheets are then advanced in superposed relation into the processor and between a pair of pressure applying rollers which rupture a container, on the image receiving sheet, holding a supply of fluid processing composition and distribute the fluid between the superposed sheets to initiate a well-known development and diffusion transfer process. Following a suitable imbibition period, the sheets are separated to reveal a positive image print on the image receiving sheet.

Generally, the photosensitive image recording sheet is initially provided in a protective opaque envelope which is withdrawn from the cassette through a light sealed end opening after the cassette is closed to render it light tight. Therefore, to facilitate withdrawal of the envelope (and later the exposed image recording sheet) it is desirable that the structure of the closed cassette not apply any appreciable force or pressure on the sheet which would inhibit its advancement in a direction parallel to an internal film bearing surface that defines a film plane within the cassette. On the other hand, it is most desirable that the film unit have sufficient pressure applied thereto to urge it into intimate contact with the bearing surface to accurately locate it at the film plane for exposure. Additionally, in those cassettes designed for radiographic applications, such pressure is also utilized to urge an intensifying screen, within the cassette, into intimate contact with an X-ray sensitive recording sheet to enhance image formation.

Cassettes designed for such applications generally have some type of pressure applying mechanism or pressure plate that is releasably latched in a pressure applying position for exposure and then is unlatched to relieve the pressure to facilitate film withdrawal.

One such cassette has a pressure latching system that is designed to cooperate with latch release structure on the cassette receiving tray for automatically unlatching the pressure applying device in response to locating the cassette at an operative position thereon wherein the film withdrawal slot at one end of the cassette faces the entry opening of the processor in preparation for film processing.

As described in commonly-assigned U.S. Pat. No. 4,156,568 and copending application U.S. Ser. No. 841,889 filed on Oct. 13, 1977 by Herman E. Erikson and entitled "X-ray Cassette For Large Format Film", now U.S. Pat. No. 4,186,308, this cassette includes an internal pressure plate that presses an intensifying screen against the film unit, after the opaque envelope has been withdrawn, in response to manually moving a slide handle to set a pair of longitudinally extending internal latch rods in a pressure applying latching position. The cassette receiving tray mounted on the processor includes a pair of rearwardly extending latch release pins at the forward end of the tray which extend into a pair of openings on the leading end wall of the cassette and push the latch rods rearwardly to an unlatching position in response to sliding the cassette forwardly in the tray to a fully inserted operative position.

The present invention is directed to a photographic apparatus or cassette receiving adapter that is specifically designed for use with an improved large format film cassette of the type described and claimed in commonly-assigned copending application U.S. Ser. No. 108,457 filed on even date herewith by Daniel A. Buldini and Donald Richards and entitled "Cassette For Large Format Film Unit". The disclosure in said application is incorporated herein by reference.

Unlike the previously-noted cassette (Ser. No. 841,889), this cassette eliminates the need for a separate pressure plate and therefor is less complex, easier to manufacture and less costly. Instead, the cassette base and cover sections that are coupled together in telescoping relation for movement toward and away from one another in a direction transverse to the film plane between a first closed position where there is minimal pressure applied to the film unit to permit envelope and film withdrawal and a second closed position wherein the base and cover sections are closer together and sufficient pressure is applied to urge the film unit into intimate contact with a film bearing surface and to urge an intensifying screen into intimate contact with the film unit. Thus the cover section acts both as a component of the cassette housing and a pressure applying device.

To releasably latch the cassette components in the second closed position, the cassette utilizes independently operable longitudinally spaced forward and rear latching devices which are forwardly biased into a latching position and are adapted to be released by sliding cooperating forward and rear longitudinally spaced pressure latch release members, disposed on exterior side wall portions of the cover section, rearwardly to an unlatching position. Accordingly, there is a need for a cassette receiving adapter that includes structure for automatically actuating these release members to release the pressure on the film unit in preparation for film withdrawal.

Therefore, it is an object of the invention to provide a photographic apparatus for use with a film processor for receiving and supporting such a cassette and for automatically actuating the forward and rear latch release members in response to locating the cassette at an operative position on the apparatus.

It is another object to provide such an apparatus that is simple in its construction and operation.

Another object is to provide an apparatus which is configured to effect the release of the forward and rear cassette latches substantially simultaneously.

Yet another object is to provide such an apparatus that releasably retains the cassette at its operative position when the spring biased forward and rear latches are moved to the unlatching position.

Still another object is to provide such an apparatus that allows the cassette to be slidingly advanced into a cassette receptacle without prematurely actuating either one of the forward and rear latch release members.

Other objects of the invention will, in part, be obvious and will, in part, appear hereinafter.

SUMMARY OF THE INVENTION

The present invention provides a simply constructed photographic apparatus that is useful with a large format self-developing film processor for receiving a cassette holding an exposed film unit and including releasably latched means for applying pressure to the film unit to urge it against a surface within the cassette, for supporting the cassette at an operative position wherein a film withdrawal slot at the leading end of the cassette is adjacent an entry of the processor, and for unlatching the pressure applying means to substantially reduce the pressure on the film unit and thereby facilitate its movement over the surface as the film is advanced through the withdrawal slot into the processor entry.

The cassette is of the type including longitudinally spaced forward and rear pressure latch release members that are forwardly biased into a pressure latching position and are adapted to be moved rearwardly therefrom to an unlatching position. In the illustrated embodiment the cassette includes two sets of these latch release members disposed on opposite laterally spaced exterior side walls of the cassette's cover section. The forward and rear release members each have different configurations. In the illustrated embodiment the forward release member has a narrow actuator coupling notch therein while the rear release member has a wider notch therein.

The apparatus includes a body; means for attaching the body to the film processor; a longitudinally extending cassette receptacle on the body for receiving the cassette and supporting it at an operative position; and forward and rear latch release actuators for, respectively, engaging and actuating the forward and rear latch release members on the cassette.

The forward and rear actuators are longitudinally spaced along a path of travel followed by the forward and rear release members as the cassette is slidingly advanced into the receptacle so that the forward release member passes by the rear actuator before it is in position to be engaged by the forward actuator.

The forward actuator has a first configuration that is complementary to the configuration of the forward release member so as to become coupled thereto after engagement.

The rear actuator has a second configuration that is complementary to the different configuration of the rear release members so as to become coupled thereto upon engagement but yet allows engagement with the forward release member as it passes by without becoming coupled thereto.

The forward and rear actuators are arranged along the path of travel so that the forward actuators become coupled to the forward and rear release members, respectively, as the cassette approaches the operative position and thereafter effect rearward movement of the forward and rear release members to the unlatching positions in response to further forward movement of the cassette toward the operative position.

The apparatus also includes a spring biased cassette position maintaining member that is deflected from a first position to a second position allowing the cassette to slide thereover into the receptacle and automatically returns to the first position, after the trailing end of the cassette passes by, to locate a cassette positioning stop behind the trailing end wall of the cassette to prevent its rearward movement away from the operative position resulting from a reaction force generated by moving the cassette latches to the unblocking position.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
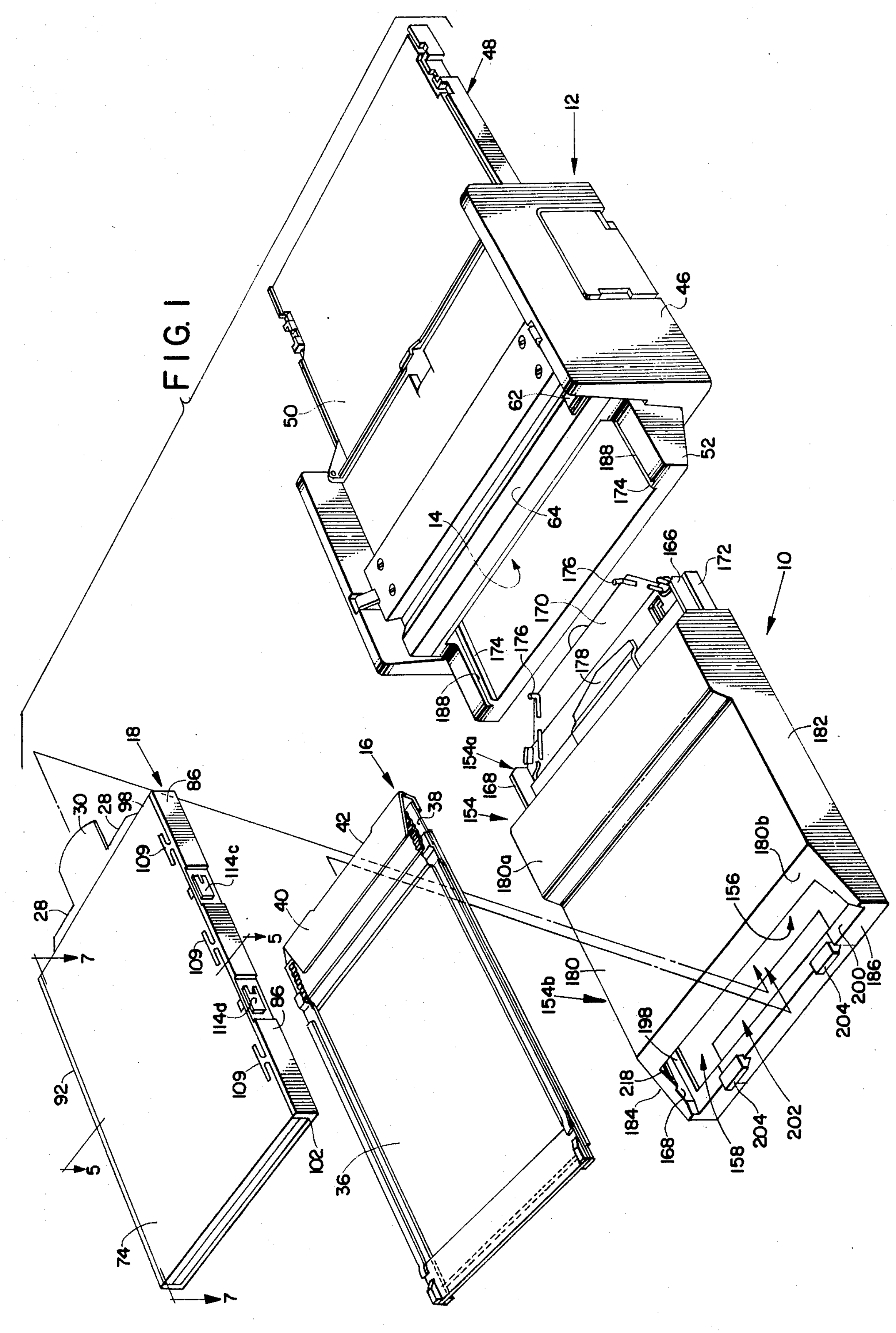
FIG. 1 is an exploded perspective view of a large format film processor, a cassette holding an exposed photosensitive film sheet, an image receiving sheet, and a photographic apparatus embodying the present invention usable with the processor for receiving and supporting the cassette and image receiving sheet.
Figures 2, 3, 4, 13:
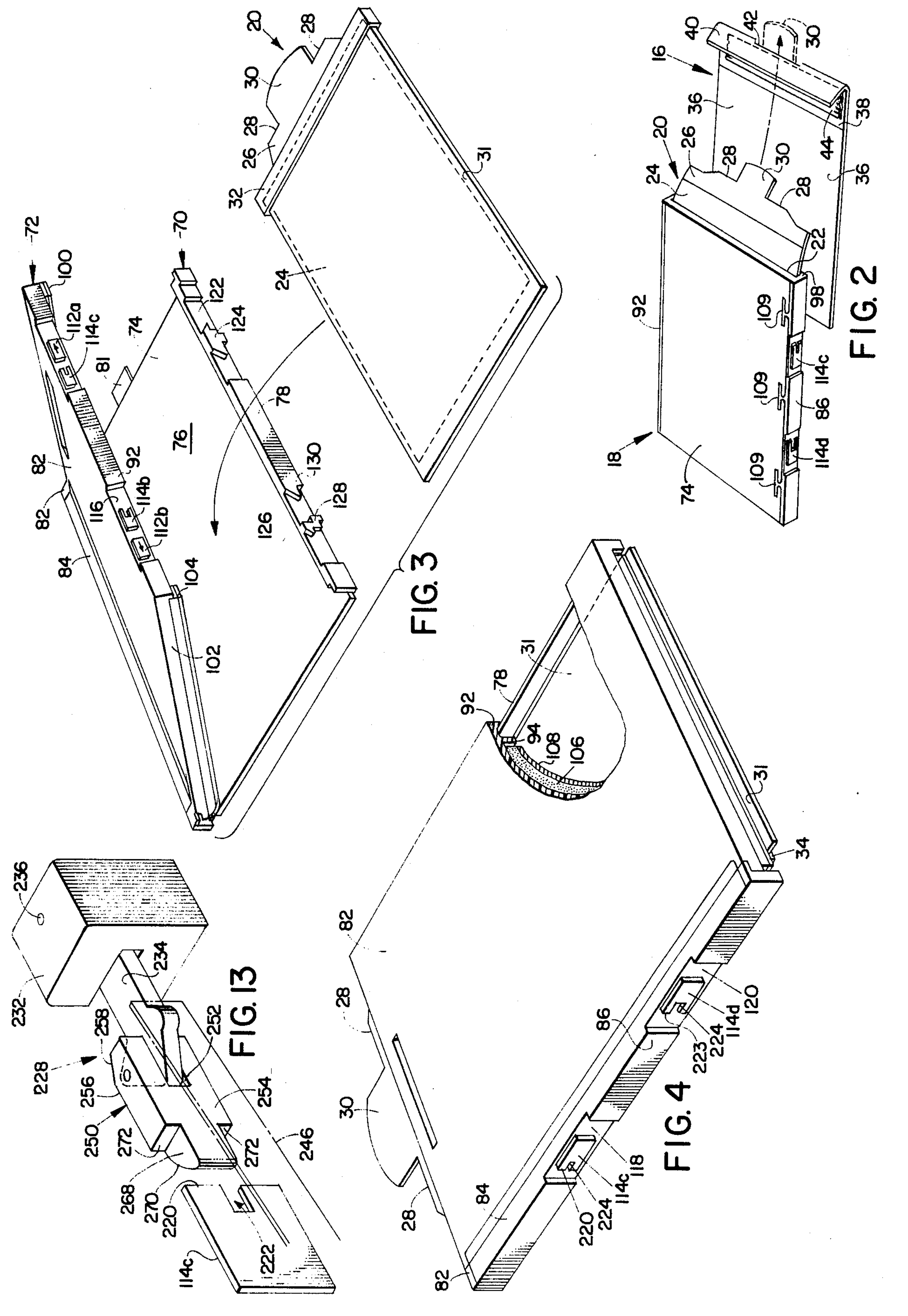
FIG. 2 is a pictorial drawing showing the path of travel of a leader tab on the film sheet through a receiving slot in a leader on the image receiving sheet.
FIG. 3 is a perspective view of the cassette of FIG. 1 shown in its open position and a photosensitive film assembly that is insertable therein.
FIG. 4 is a perspective view of the cassette shown in its closed position with a film unit therein and having a portion of the cassette broken away to show its interior construction.
FIG. 13 is a perspective view of a rear actuator assembly and a cassette forward release member.

With reference to FIGS. 1 and 2, the present invention provides an improved photographic apparatus or adapter 10 that is releasably attachable to a large format self-developing film processor 12, by inserting the leading end of apparatus 10 into an entry opening 14 of processor 12, for receiving a separate image receiving film sheet 16 and a cassette 18 holding an exposed photosensitive film sheet 20 that cooperates with image receiving sheet 16 to form a large format (e.g., 8×10) self-developing film unit. As will be described herein, apparatus 10 is operative for supporting cassette 18 at an operative position wherein a film withdrawal slot 22 at the leading end of cassette 18 is adjacent the processor entry 14 and for unlatching pressure applying structure in the cassette to substantially reduce pressure on the film unit sheet 20 and thereby facilitate its movement over a film bearing surface as the film unit sheet 20 is advanced through the withdrawal slot 22 and into the processor entry opening 14, along with image receiving sheet 16, where the two sheets will be advanced between a pair of later-to-be-described pressure applying rollers for processing.

As best shown in FIGS. 2 and 3, the photosensitive film unit 20 comprises a rectangular base sheet 24 having one or more photosensitive layers thereon, and a film manipulation tab 26 secured to the leading end of sheet 24 and including thereon a laterally extending shoulder portion 28 and a forwardly extending tab 30. Film unit 20 also includes a light opaque envelope 31 which protectively covers photosensitive sheet 24 from ambient illumination and has its open leading end slidably inserted into a retaining cap 32 on leader 26. After film unit 20 is located in the light tight environment of cassette 18, envelope 31 is slidably withdrawn from cassette 18 through its light sealed trailing end opening 34.

The image receiving component 16 of the self-developing film unit includes a generally rectangular image receiving sheet 36, a leader 38 attached to the leading end of sheet 36 and including a folded back flap 40 having a central slot 42 at the forward fold line, and a rupturable container 44, holding a supply of fluid processing composition, on leader 38 under flap 40.

In the illustrated embodiment the cassette 18 and self-developing film unit are configured for radiographic or X-ray applications. In use, the cassette 18 holding photosensitive film unit 20 is mounted on an X-ray apparatus to expose the film unit 20. Thereafter, the cassette is located in apparatus 10 in superposed relation with the image receiving film sheet 16 so that the tab 30 is advanced through the slot 42 on image receiving sheet leader 38. When tab 30 is so inserted, the shoulders 28 of leader 26 engage the image receiving leader 38, to either side of slot 42, thereby coupling together the photosensitive sheet 20 and the image receiving sheet 16 in registered superposed relation. As will be described later, tab 30 extends into the bite of a pair of pressure applying rollers in processor 12 which rotate to advance a coupled sheets therebetween. The application of a compressive pressure by the rollers causes container 44 to rupture and thereby release the fluid processing composition which is then spread in a thin layer between the facing photosensitive and image receiving sheets 24 and 36 to initiate a well-known development and diffusion transfer process. Following a suitable imbibition period, the photosensitive and image receiving sheets are peeled apart to reveal a positive print on image receiving sheet 36.

While the illustrated embodiment is directed to a self-developing film unit that is sensitive to X-ray radiation, the apparatus 10 may be used with film units and cassettes that are designed for conventional photography. For examples of X-ray sensitive, black and white, and color self-developing film units that may be used with the apparatus embodying the present invention, reference may be had to commonly-assigned U.S. Pat. Nos. 2,698,236; 2,698,237; 2,698,245; 2,983,606; and 4,009,031.

Figure 9:
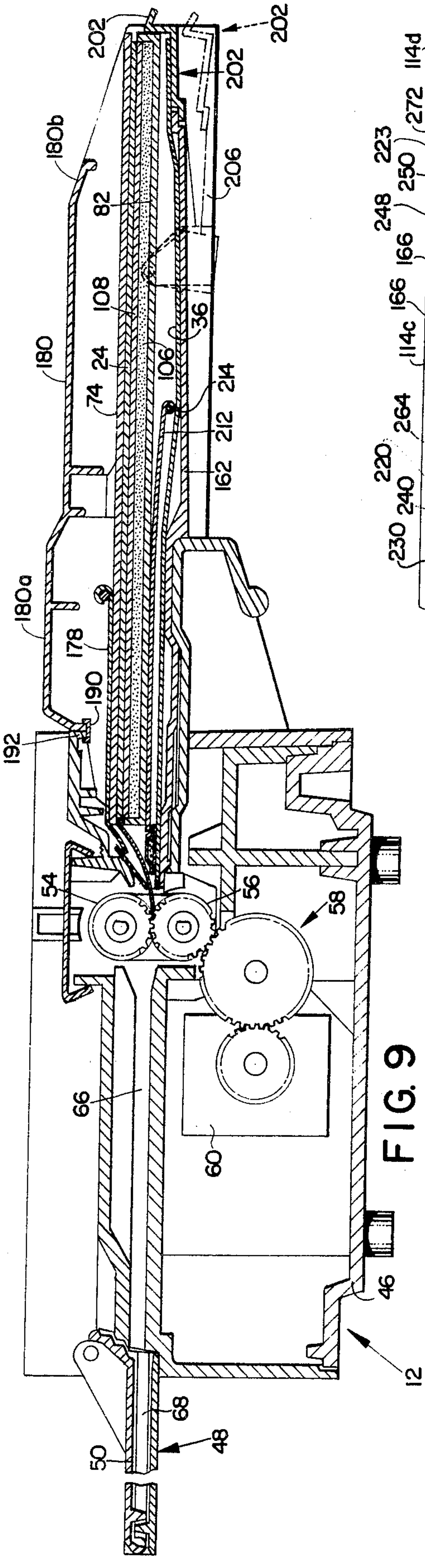
FIG. 9 is a cross-sectional view of the processor, and the apparatus embodying the present invention shown at its operative position on the processor.

As most clearly shown in FIGS. 1 and 9, the illustrated film processor 12 is similar in most respects to a commercially available processor marketed by Polaroid Corporation, Cambridge, Massachusetts, under the designation 8×10 Polaroid Land Film Processor.

Processor 12 includes a generally box-like main housing 46 having the entry opening 14 on one side thereof and a fold out film imbibition chamber assembly 48 extending outwardly from the opposite side of housing 46 and including an access door 50. Defining a lower portion of entry opening 14 is an outwardly extending cantilevered shelf 52 for releasably receiving the leading end portion of apparatus 10 and contributing to its support on processor 12.

As best shown in FIG. 9, the entry opening 14 communicates with an interior pair of laterally extending juxtaposed pressure applying rollers 54 and 56. Rollers 54 and 56 are rotatably coupled together by elements of a gear train 58 which also serves to couple the rollers 54 and 56 in driving relation to an electrical motor 60. Motor 60 is actuated to initiate a cycle of processor operation by depressing a cycle start button 62 provided on an apron 64 over entry opening 14.

The superposed image recording and image receiving sheets 20 and 16 are advanced by the rollers 54 and 56 therebetween for fluid distribution and along a light tight passageway 66 on the exit side of the rollers and into a connecting light tight film receiving chamber 68 in assembly 48. After a suitable imbibition period, access door 50 is opened and the film unit may be removed to peel apart the positive and negative elements.

For a more detailed description of the structure and operation of processor 12, reference may be had to commonly-assigned U.S. Pat. No. 4,019,194 which is incorporated by reference herein.

Because apparatus 10 is particularly configured to automatically effect the unlatching of pressure applying structure in cassette 18 when it is inserted into apparatus 10, cassette 18 will be described in some detail to provide the background necessary to understand the structure and operation of apparatus 10.

The illustrated cassette 18 is configured for radiographic applications and is of the type that is described and claimed in commonly-assigned copending U.S. Patent Application Ser. No. 108,457 filed on even date herewith by Daniel Buldini and Donald Richards. This application is entitled "Cassette For Large Format Film Unit" and is incorporated by reference herein.

As best shown in FIGS. 1–5, cassette 18 is of the book opening type and is a generally longitudinally extending rigid structure formed of any suitable material that is opaque to visible light but is substantially transparent to X-ray radiation. The main structural components of cassette 18 include a base section 70 and an overlying cover section 72.

Base section 70 comprises a generally planar bottom wall 74 having an interior film plane defining bearing surface 76, and a pair of opposed laterally spaced side walls 78 and 80. A flexible tab 81 provided at the leading end of bottom wall 74 engages the cap 32 on the leader 26 of film unit 20 to provide accurate longitudinal registration of the film unit 20 on bottom wall 74 and releasably retain the film unit 20 at its operative position in the cassette while the opaque envelope 31 is withdrawn.

The cover section 72 includes a generally planar top wall 82 that is hinged at flexible hinge strip 84; a first double side wall assembly comprising exterior side wall 86 and interior side wall 88 defining a longitudinally extending channel 90 therebetween for receiving base section side wall 80 and oppositely spaced second double side wall assembly comprising exterior side wall 92 and interior side wall 94 defining longitudinal channel 96 therebetween for receiving base section side wall 78; a leading end wall 98 configured to cooperate with the leading end of bottom wall 74 to define leading end opening 22 which is light sealed by a resiliently compressible light sealing strip 100; and a trailing end wall 102 that cooperates with the trailing end of bottom wall 74 to define the trailing end opening 34 that is light sealed by a resiliently compressible light sealing strip 104.

Secured to the interior surface of the pivoting portion of top wall 82 is a resiliently compressible pad 106 having a generally planar phosphor image intensifying screen 108 secured to its bottom side so as to be in facing relation to bearing surface 76 when cover section 72 is in the closed position shown in FIG. 4.

In FIGS. 3 and 4, the cassette 18 is shown in its normal film loading configuration. That is, base section 70 is at the bottom and cover section 72 is positioned on top of base section 70. However, when cassette 18 is to be inserted into the cassette receiving apparatus 10, it is turned over so that the base section 70 faces upwardly as shown in FIGS. 1 and 2. To more clearly describe how cassette 18 interacts with structure on apparatus 10, the cassette is also shown in its inverted position in FIGS. 5–8.

As best shown in FIG. 1, the short side of cover section 72 includes a plurality of integrally formed T-shaped slide connectors 109 integrally formed on the interior side of cover section side wall 86 and extending into complementary receiving slots in base section side wall 80. In this manner, cover section side wall 86 is coupled to base section side wall 80 for vertical sliding movement between first closed position shown in FIGS. 4, 6 and 8 and a second closed position shown in FIGS. 5 and 7.

As most clearly shown in FIG. 3, cover section side wall 92 includes a forward recess 110 having slidably mounted therein a first closed position latch release member or button 112*a* and a second closed position latch release member or button 114*a*. A second or rear recess 116 in side wall 92 has a similar set of latch release members therein designated 112*b* and 114*b*. As most clearly shown in FIG. 4, the opposite exterior side wall 86 of cover section 72 includes a forward recess 118 having a second closed position latch release member or button 114*c* slidably mounted therein, and a second or rear recess 120 having a similar latch release member or button 114*d* therein.

As best shown in FIG. 3, base section side wall 78 includes a forward recess 122 having a centrally disposed integrally formed latch detent member 124 therein, and a rear recess 126 having a centrally disposed latch detent member 128 and a second latch detent member 130 disposed at the forward end of recess 126. The operation of the latch release members or buttons and the corresponding detent members will become clear with the following description of corresponding latch members shown in FIGS. 7 and 8 of the drawings.

Figure 7:
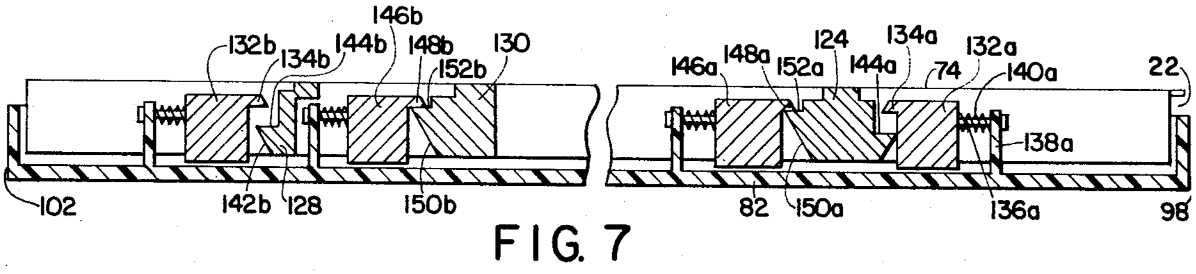
FIG. 7 is a longitudinal cross-sectional view of the cassette, taken along line 7—7 of FIG. 1, showing cassette latching structure shown releasably latching the cassette in its second closed position.
Figure 8:
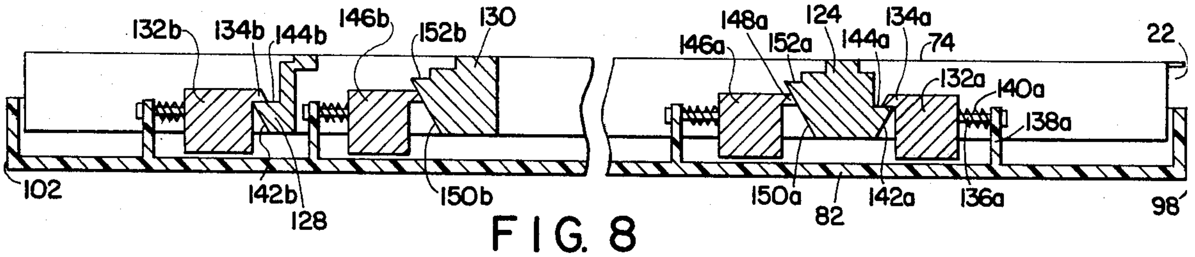
FIG. 8 is similar in some respects to FIG. 7 but shows the latching structure releasably latching the cassette in its first closed position.

As most clearly shown in FIGS. 3, 7 and 8, the forward first closed position latch release member 112*a* includes an interior pin that extends through an elongated longitudinally disposed slot in cover section recess 110 and is fixedly attached to a first closed position latch member 132*a* slidably mounted in channel 96 for movement in the forward position of recess 122 toward and away from the forward facing portion of detent member 124. Latch member 132*a* includes a cam following foot 134*a* having an inclined edge and a mounting pin 136*a* projecting outwardly from the opposite side of latch member 132*a*. Pin 136*a* extends through an opening in a mounting post 138*a* depending from cover top wall 82. The free end of pin 136*a* is peened over to prevent it from becoming uncoupled from post 138*a*. A helical biasing spring 140*a* wound around pin 136*a* urges latch member 132*a* rearwardly toward the forward face of detent member 124.

The forwardly facing portion of detent member 124 includes an inclined cam surface 142*a* that leads to a reentrant step or detent surface 144*a*.

The rear first closed position latch release member 112*b* is similarly coupled to a second closed position latch member 132*b* which is similarly mounted but is biased forwardly towards detent member 128. Detent member 128 includes a corresponding inclined cam surface 142*b* and a reentrant step or detent surface 144*b* which face in the opposite direction to the corresponding detent structure on detent member 124*a*.

The forward second closed position latch release member 114*a* is coupled to a slidingly mounted second closed position latch member 146*a* which includes a latch foot 148*a* and is spring biased forwardly towards the opposite side of detent member 124*a* which includes an elongated inclined cam surface 150*a* and reentrant step or detent surface 152*a*.

Likewise, the rear second closed position latch release member 114*b* is coupled to another second closed position latch member 146*b* that is spring biased forwardly toward corresponding cam surface 150*b* and detent surface 152*b* on detent member 130.

It will be assumed that cassette 18 is in its open position shown in FIG. 3. After the photosensitive film unit 20 is loaded therein, the pivoting portion of cover section 72 is closed so that cassette 18 assumes the first closed position shown in FIGS. 4, 6 and 8. It should be noted that in FIGS. 5–8 the cassette is shown in its inverted position with bottom wall 74 facing upwardly for preparation for insertion into apparatus 10.

As the cover section 72 is closed, the inclined edges of the latch feet ride along the corresponding inclined cam surfaces of the respective detent members. When cover section 72 reaches the first closed position, the foot members 134*a* and 134*b* clear the ends of cam surfaces 142*a* and 142*b*, respectively, thereby allowing the biasing springs to slide the latch members 132*a* and 132*b* over the detent surfaces 144*a* and 144*b*, respectively. It will be noted that in the first closed position, the foot portions 148 of the latch members 146 remain in contact with the longer cam surfaces 150.

It should be noted that there is a second set of second closed position latch members 146 and corresponding detent members on the opposite side of the cassette. These second closed position latch members 146 are identical to those shown in FIGS. 7 and 8 and are respectively coupled to the two second closed position latch release members **114*c* and 114*d***.

When cassette 18 is in the first closed position, the oppositely disposed resiliently compressible light seals 100 and 104 bear against the opposite longitudinal ends of surface 76 and are slightly compressed to thereby light seal the leading and trailing end openings 22 and 34, respectively, of cassette 18. The slight compression of these resilient seals also tends to force the base and cover sections away from each other slightly to maintain the feet 134 of the latch members 132 in engagement with the detent surfaces 144.

Figure 6:
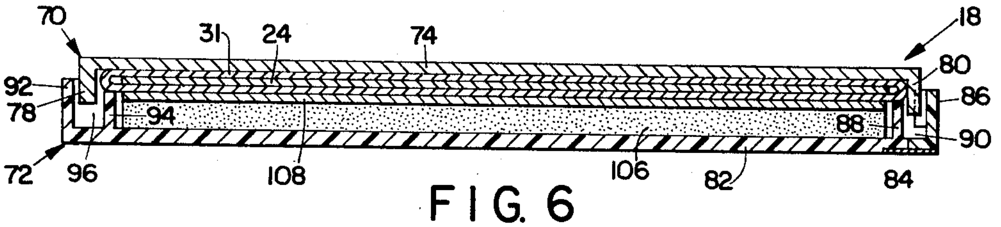
FIG. 6 is similar in some respects to FIG. 5 but shows the cassette in its first closed position.

As best shown in FIG. 6, the interior surface of top wall 82 is spaced from the film bearing surface 76 by a fixed distance which allows the resilient pad 106 to remain in an uncompressed state and provide sufficient clearance between the surface of intensifying screen 108 and film bearing surface 76 to accommodate the thickness of photosensitive sheet 24 and the enclosing envelope 31 therebetween without applying any appreciable pressure to the film unit in a direction transverse to the film plane defined by surface 76.

Therefore, the first closed position of cassette 18 locates its interior components so there is minimum pressure on the film unit 20 thereby facilitating the removal of the envelope 31 through trailing end opening 34. That is, the envelope 31 may be withdrawn in a direction generally parallel to the film plane and advanced over the film bearing surface 76 and the facing surface of intensifying screen 108 with minimal frictional pressure thereon. Likewise, after film exposure, it is desirable to return cassette 18 to its first closed position to facilitate the advancement of the exposed film unit 20 through the forward withdrawal slot 22.

Figure 5:
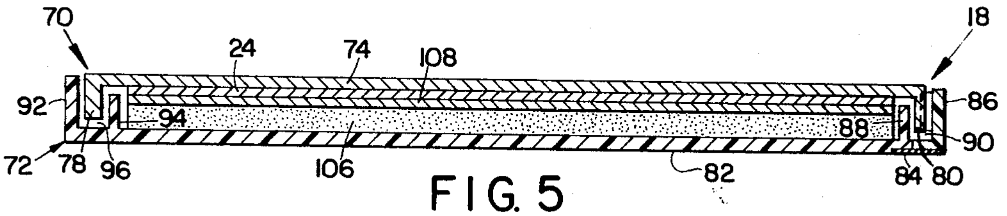
FIG. 5 is a cross-sectional view of the cassette, taken along line 5—5 of FIG. 1, shown in its second closed position.

After the envelope 31 is withdrawn, the cassette 18 may be located in its second closed position by manually pushing the telescoped base and cover sections 70 and 72 toward one another to decrease the distance between the interior of top wall 82 and film bearing surface 76. This condition is shown in FIG. 5 wherein the resilient pad 106 is compressed and provides a biasing force on the intensifying screen 108 to urge the intensifying screen into intimate contact with the photosensitive side of sheet 24 while urging the opposite side thereof into intimate contact with bearing surface 76. As noted earlier, it is desirable to apply such pressure in a direction transverse to the film plane to accurately locate the film unit at the film plane and also to maintain good contact between the intensifying screen 108 and the photosensitive portion of the film unit 20 to enhance image formation when intensifying screen 108 gives off visible light in response to excitation by the impinging X-ray radiation.

As best shown in FIG. 7, the four second closed position latch members 146 releasably latch the cassette in the second closed position in response to pressing the base and cover sections closer together. That is, the foot portion 148 of latch member 146 follows the inclined cam surface 150 until the foot 148 clears surface 150 and is biased forwardly over the detent surface 152.

In the second closed position, both the resilient light seals 100 and 104 and the pad 106 are compressed and provide a reaction force that tends to urge the base and cover sections 70 and 72 apart. This reaction force maintains the second closed position latch members 146 in latching relation with the detent surfaces 152.

After film exposure, it is desirable to release the second closed position latch members 146 so that the cassette 18 will automatically return to the first closed position in preparation for film withdrawal. From the previous explanation it will be obvious to those skilled in the art that the latch members 146 may be released by engaging the four latch release members 114 and moving them rearwardly against the force of the biasing springs that tend to urge latch members 146 forwardly. By effecting the rearward movement of the latch members 46 from the latching position of FIG. 7 to the unlatching position of FIG. 8, the cassette 18 automatically assumes its first closed position in response to expansion of light seals 100 and 104 and pad 106 and is releasably latched thereat by the first closed position latch members 132. After film withdrawal, the latch members **132*a* and 132*b* may be unlatched by manually moving the latch release members 112*a* and 112*b* in opposite directions shown by the arrows thereon in FIG. 3**.

Referring to FIGS. 1 and 9, the photographic apparatus or cassette receiving adapter 10, embodying the present invention, comprises a generally rigid, longitudinally extending body 154 formed by a relatively short first or forward body section **154*a* that extends into processor housing 46 through entry opening 14; and a substantially enclosed communicating second or rear body section 154*b* which is longer and slightly wider than section 154*a* and extends rearwardly therefrom outside of processor housing 46 with a short forward portion of section 154*b* resting on support shelf 52 and the longer rearward portion extending outwardly therefrom in cantilever fashion. Body section 154*b* has a laterally extending trailing end opening 156 therein through which image receiving sheet 16 is inserted into an interior receiving tray 158 and also through which cassette 18 holding an exposed film unit 20, is inserted into on overlying cassette receptacle 160. In a preferred embodiment, the major components of apparatus 10** are of molded construction utilizing any suitable thermoplastic material, for example a polycarbonate, which may also include some fiberglass reinforcement for rigidity.

Body sections **154*a* and 154*b* include certain common components including a longitudinally extending bottom wall 162 having its forward underside portion contoured to conform to the shape of the horizontal portion of shelf 52 and including an interior surface 164 that serves as the major support surface of tray 158; and a pair of vertical, opposed, laterally spaced side walls 166 and 168 having interior surfaces that define the interior side portions of cassette receptacle 160**.

The forward portion of bottom wall 62 on body section **154*a* includes a laterally tapering section 170 that extends forwardly of the forward ends of side walls 166 and 168. Integrally formed on the exterior side of side walls 166 and 168 is a pair of longitudinally extending lower guide rails 172 that fit against longitudinal guide surfaces 174 on shelf 52 for accurately positioning apparatus 10 relative to processor opening 14 and guiding section 154*a* thereinto. As best shown in FIG. 1, section 154*a* includes a pair of wire form holdback fingers 176** serving as stops for the forward end of image receiving sheet 16 located in tray 158 and a sheet metal tongue 178 for lifting the flap 40 on image receiving sheet leader 38 to provide better access to slot 42 for the forwardly extending tab 30 on photosensitive film unit 20.

Body section 154*b* includes a top wall 180 having a raised forward section 180*a* and a downwardly inclined trailing end section 180*b* that is suitably shaped to define a major part of the trailing end opening 156; a pair of vertically depending exterior side walls 182 and 184 that are located outboard of the interior side walls 166 and 168, respectively, and a trailing end wall section 186 below trailing end slot 156.

The side walls 182 and 184 and the lateral side portions of bottom wall 162 adjacent thereto are configured to slide onto L-shaped guideways 188 on opposite sides of shelf 52 above the guide surfaces 174. As best shown in FIG. 9, the forward edge of top wall section 180*a* includes an integrally formed resilient hook 190 that snaps under a horizontal flange 192 over the processor opening 14 when apparatus 10 is inserted thereinto to releasably attach apparatus 10 to processor 14.

Figure 11:
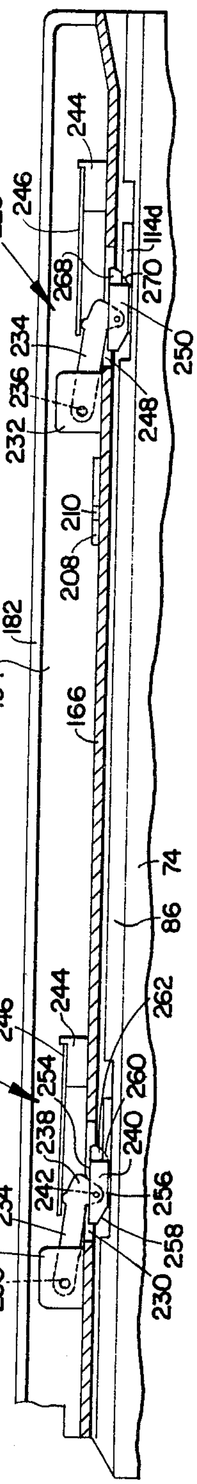
FIG. 11 is a plan view of a selected portion of the apparatus showing the details of the latch releasing actuators.

The exterior side walls 182 and 184 of body section 154*b* are laterally spaced from the corresponding interior side walls 166 and 168, respectively, to define a pair of longitudinally extending channels 194 therebetween. The channel 194 on the right-hand side of body section 154*b* is best shown in FIG. 11. Although not shown in the drawings, a similar channel 194 is formed on the left side of the apparatus 10 between exterior side wall 184 and interior side wall 168.

Figure 12:
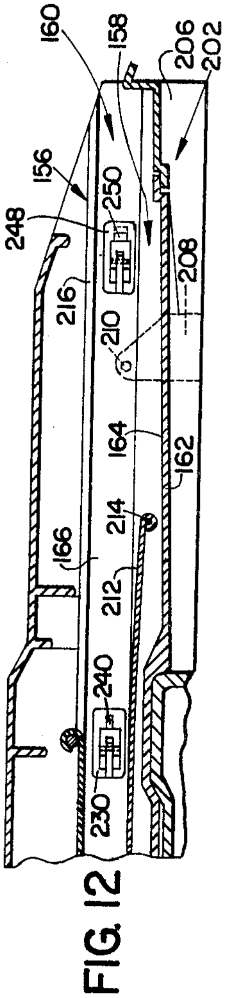
FIG. 12 is a cross-sectional view of a portion of the apparatus embodying the present invention showing the location of forward and rear actuator heads.

As best shown in FIGS. 1 and 12, apparatus 10 is provided with a pair of relatively narrow longitudinally extending cassette supporting side rails 196 and 198 and a transverse rail 200 extending between the trailing end of rails 196 and 198 over trailing end wall 186 at the bottom of opening 156. Rails 196, 198 and 200 are raised above the interior surface 164 of bottom wall 162. The interior vertical portions of these rails define the boundary on three sides of the tray 158 for receiving image recording sheet 16. The upper horizontal surfaces of these rails serve to support the marginal portions of the cassette 18 above tray 158 and thereby define the bottom plane of the cassette receptacle 160.

As best shown in FIGS. 1 and 9, the bottom trailing end of tray 158 and receptacle 160 includes a displaceable section 202 that is movable between a first operative position, shown in solid lines in FIG. 9, wherein section 202 is flush with bottom wall 162 and a second position where section 202 is displaced downwardly to permit a cassette 18 to be slidably inserted into or withdrawn from receptacle 160 through opening 156 as shown in dotted lines in FIG. 9.

Section 202 includes a pair of laterally spaced upstanding tabs 204 located on the central portion of transverse rail 200 forming part of section 202 for engaging the trailing end wall 102 of cassette 18 when the cassette is at its fully inserted position in receptacle 160 and section 202 is in its first or operative position as most clearly seen in FIG. 9. Section 202 also includes a longitudinally extending section 206 having a pair of outwardly (laterally) extending arms (not shown) which terminate in a pair of vertically disposed mounting arms 208 having top portions that extend up into channels 194 where they are pivoted about pins 210 to thereby mount section 202 for pivotal movement between its first and second positions. Although not shown in the drawings, section 202 includes a pair of spring members for biasing section 202 into its operative first position.

As best shown in FIGS. 9 and 12, the tray 158 includes an image recording sheet cover plate 212 therein which is pivoted at its lateral sides at pins 214 and is spring biased upwardly by a spring (not shown) from the position shown in FIG. 9. Before cassette 18 is inserted, the image receiving sheet 16 is inserted, leading end first, into tray 158. At this time, cover plate 212 is raised so that a central opening at the trailing end thereof permits the relatively thick leading end of image recording sheet 16 to slide thereunder into its operative position at the leading end of bottom wall 162 where the forward edge of flap 40 abuts against the upstanding fingers of stops 176.

Once image recording sheet 16 is located in tray 158, the cassette 18 holding the exposed film unit 20 is inserted, leading end first, through trailing end opening 156 on apparatus 10. The weight of the cassette resting on the top of tabs 204 causes the displaceable section 202 to automatically move to its second position (moving tabs 204 out of their partial blocking relation to opening 156) so that the cassette may slide thereover on rails 196 and 198 toward the forward end of receptacle 160. The leading end of cassette 18 deflects cover plate 212 downwardly so that its forward end holds down the leader 38 at the forward end of image recording sheet 16.

As best shown in FIGS. 1 and 12, the interior side walls 166 and 168 include longitudinally and inwardly extending rails 216 and 218, respectively, thereon above the top surfaces of rails 196 and 198. These rails 216 and 218 engage the upwardly facing edges of cassette cover section exterior side walls 86 and 92, respectively, and thereby retain the lateral edges of cassette cover section top wall 82 in engagement with rails 196 and 198 so that the upward biasing force of cover plate 212 will not displace the cassette 18 upwardly from its operative position in engagement with rails 196 and 198.

As best shown in FIG. 9, when cassette 18 is fully inserted into receptacle 160 the flap lifting plate 178 has raised the flap 40 on image recording sheet leader 38 thereby permitting tab 30 on film unit 20 to advance through slot 42 and into the bite of the pressure applying rollers 54 and 56 within processor housing 46. Also, when cassette 18 is fully inserted, the trailing end wall 102 clears tabs 204 thereby allowing section 202 to pivot upwardly to its first or upper position.

As cassette 18 is inserted into receptacle 160 and approaches its fully inserted position, actuating structure, to be described in detail hereinafter, engages the four second closed position latch release members 114*a*, 114*b*, 114*c* and 114*d* and effects their rearward movement from the latching position to the unlatching position thereby allowing the base section 70 to pop upwardly to the first closed position and thereby relieve the pressure applied to the photosensitive sheet 24 by the intensifying screen 108 and the resiliently compressed pad 106. Once this pressure is released, processor 14 may be actuated by pressing on the cycle start button 62 to energize motor 60 which drives the rollers 54 and 56. In this manner, film unit 20 is withdrawn through the leading end opening 22 of cassette 18 and it is advanced in superposition with the underlying image recording sheet 16 through the pressure applying rollers to effect processing and into the film receiving imbibition chamber 68. After processing, cassette 18 may be removed from receptacle 160 by manually pushing section 202 downwardly until tabs 204 clear the trailing end wall of cassette 18 and then pulling the cassette 18 out through opening 156.

Just before cassette 18 reaches its fully inserted position in receptacle 160, the leading end wall 98 of the cassette engages the trailing ends (not shown) of the wire form holdbacks 176 causing them to pivot 90° and thereby move the upstanding forward ends to a horizontal position so that the image receiving sheet 16 may pass thereover as it is advanced into the bite of the rollers.

The raised portion 180*a* of body section 154*b* is provided for mechanisms associated with the flap lifting tongue 178. Such mechanisms are not shown in the drawings because they form no part of the present invention.

The exterior wall structure of body section 154 substantially encloses receptacle 160 and light shields the path of travel of photosensitive film unit 20 from the leading end of the cassette to the bite of the rollers. This structure also provides apparatus 10 with a certain degree of structural rigidity.

The structure for automatically unlatching the second closed position latch members on cassette 18 in response to inserting the cassette into receptacle 160 will now be described with reference to FIGS. 1, 3, 4 and 10–13.

As best shown in FIGS. 1, 3 and 4, the forward and rear second closed position latch release members 114 are generally thin substantially rectangular piece parts including forwardly facing leading end edges 220 and 223 respectively and have a generally rectangular actuator receiving notch extending rearwardly from edges 220 and 223. The notches on the forward release members 114*a* and 114*c* are releatively narrow and carry the numerical designation 222. The actuator receiving notches on the rear release members 114*b* and 114*d* are somewhat wider than notches 222 and carry the numerical designation 224. Thus the forward release members 114*a* and 114*c* have a different configuration than the rear release members 114*b* and 114*d*. The difference in configuration is the width of the actuator receiving notches. The notches 222 on the forward release members are relatively narrow while the notches 224 on the rear release members are somewhat wider.

The apparatus 10 includes means for selectively engaging the four latch release members 114 and effecting their rearward movement relative to the side walls of cassette cover section 72 to move the four second closed position latch members 146 rearwardly against their biasing springs so that they move from the latching position of FIG. 7 to the unlatching position of FIG. 8 which allows the base section 70 to automatically pop up to a first closed position.

The means for automatically actuating the four second closed position latch release members 114 include a set of two forward actuator assemblies 226 and a set of two rear actuator assemblies 228.

FIG. 11 shows the forward actuator assembly 226 and the rear actuator assembly 228 on the right-hand side of apparatus 10 for effecting the operation of latch release members 114*c* and 114*d*, respectively. It will be understood that the left-hand side of apparatus 10 includes similar actuator assemblies 226 and 228 for operating latch release members 114*a* and 114*b*.

The forward and rear actuator assemblies 226 and 228 have most of their major structural components located in the channel 194 between interior side wall 166 and exterior side wall 182. However, each actuator assembly also includes an actuator head that is movable, through a corresponding opening in side wall 166, toward and away from cassette receptacle 160.

As best shown in FIGS. 11 and 12, the forward actuator assembly 226 is arranged in proximity to a rectangular opening 230 in side wall 166 and includes a mounting base member 232 located on the exterior side of side wall 166 forwardly of opening 230; a pivot arm 234 having its trailing end pivotally coupled to base member 232 at pivot pin 236 for pivotal movement toward and away from receptacle 160 and including an inwardly extending leading end portion 238 aligned approximately with the center of opening 230; a forward actuator head 240 pivotally coupled to portion 238 of pivot arm 234 at vertically disposed pivot pin 242; a spring mounting base member 244 mounted on the exterior of side wall 166 rearwardly of opening 230; and a leaf spring 246 having its trailing end fixedly secured to base member 244 and its forward end engageable with a bump on the rear side of arm 234 opposite pin 242 for biasing arm 234 and the actuator head 240 carried thereon inwardly so that the actuator head 240 normally projects into receptacle 160 through the opening 230.

The rear actuator assembly 228 is arranged in proximity to a rectangular opening 248 in wall 166 and is similarly constructed to forward actuator 266 except that its rear actuator head 250 is of a slightly different configuration than the forward actuator head 240 as will be explained hereinafter. Those components of rear actuator assembly 228 that are identical to corresponding components of assembly 226 will carry the same numerical designations in the drawings.

Figure 10:
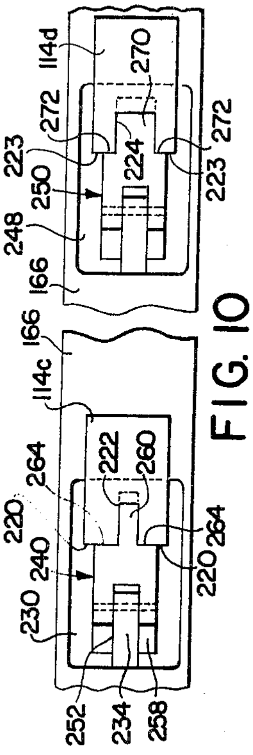
FIG. 10 is an elevational view of two separate portions of the right interior side wall of the cassette receptacle showing forward and rear actuator heads in coupled engagement with cassette forward and rear latch release members respectively.

As best shown in FIGS. 10, 11 and 12, the forward actuator head 240 includes an elongated body having a horizontal slot 252 therein extending rearwardly from its forward end to approximately the midpoint of the body for receiving the leading end portion 238 of pivot arm 234 therein. The back longitudinally extending vertical surface 254 of actuator head 240 facing channel 194 is substantially planar. The opposite forward vertical surface of head 240 includes a planar center section 256 that is substantially parallel to the surface 254; a rearwardly tapered inclined cam surface 258 to the left of surface 256 (as viewed in FIGS. 9–12) extending forwardly to the leading end of head 240; and to the right of surface 256 a rounded cam surface 260 arranged on a relatively thin and centrally disposed rearwardly extending cam member 262. The thickness of cam member 262 in the vertical direction is dimensioned in accordance with the width of the notch 222 on the forward second closed position latch release member 114*c*. At the intersection of the thin cam member 262 with the thicker main body portion of head 240 there is a pair of rearwardly facing vertically disposed upper and lower release member engaging surfaces 264 which will engage the forward edge 220 of latch member 114*c* when the cam member 262 slides into notch 222.

The rear actuator head 250 is similar in most respects to forward actuator head 240 except that the cam member 268 having the rounded cam surface 270 thereon is thicker than the cam member 262 and is dimensioned to slide into the wider notch 224 in the rear second closed position release member 114*d* and includes upper and lower vertical engaging surfaces 272 for engaging the leading edge 223 of release member 114*d* on either side of notch 224. It should be noted that the thickness of cam member 268 on rear actuator head 250 is greater than the width of the notch 222 on the forward release member 114c.

As best shown in FIG. 13, when the forward end of the cassette 18 is inserted into the receptacle 160, the forward release member 114c must pass by the rear actuator head 250 before it can come into engagement with the forward actuator head 240. Therefore, the rear actuator head must be configured to allow the forward release member 114c to pass thereby without causing the release member 114c to be moved rearwardly to its unlatching position and thereby prematurely release the corresponding latch member 146c. When the latch release member 114c approaches the rear actuator head 250, the leading edge 220 of release member 114c will engage the rounded cam surface 270 of cam member 268. Because cam surface 270 of the thicker cam member 268 is wider than the notch 222, cam member 268 will not slide into notch 222. It will, however, ride up and over the exterior surface of latch member 114c thereby causing the actuator head 250 to retract outwardly into channel 194 against the bias of spring 246 thereby allowing release member 114c to slide by actuator head 250 with its exterior surface in engagement with the flat forward surface 256 of rear actuator head 250.

The forward and rear actuator heads 240 and 250 are longitudinally spaced in conformance with the spacing of the forward and rear second closed position latch release members 114c and 114d and are positioned to lie along the path of travel of these two release members as the cassette 18 is inserted into the receptacle 160.

In operation, the cassette 18 is mounted on an appropriate X-ray apparatus to expose the film unit 20 therein. An image receiving sheet 16 is inserted into tray 158 through opening 156 and then cassette 18 is inserted, leading end first, through opening 156 to advance it into receptacle 160.

It will be noted that the cassette 18 is inserted with the orientation shown in FIG. 1. That is, the base section 70 faces upwardly and the cover section 72 faces downwardly. That means that the cassette side wall 86 having the two second closed position latch release members 114c and 114d thereon will face the right-hand interior wall 166 of cassette receptacle 116 and the opposite side wall 92 of the cassette having the first closed position latch release members 112a and 112b thereon as well as the two second closed position latch release members 114a and 114b thereon will face the left-hand interior side wall 168 of cassette receptacle 116. As noted earlier, a second set of forward and rear actuator assemblies 226 and 228 are provided on the left-hand side of apparatus 10 to effect the operation of latch release members 114a and 114b.

The leading end of cassette 18 is inserted through opening 156 and the weight thereof depresses section 202 to its second position. The top wall 82 of cassette cover section 72 rests on the side guide rails 196 and 198. Also the top edges of cassette side walls 86 and 92 slide under the hold down rails 216 and 218 located on interior side walls 166 and 168, respectively.

As cassette 18 is advanced into receptacle 160 the leading edges of side walls 86 and 92 engage the cam surfaces 270 of cam members 268 on the rear actuator heads 250 and cause the heads 250 to be deflected outwardly to a position where the flat front surface 256 is in engagement with the exterior surface of the side wall.

For the sake of brevity and clarity of description only the interaction between the release members 114c and 114d on cassette side wall 86 with the forward and rear actuator assemblies 226 and 228 on the right side of apparatus 10 will be described. But, it will be noted that the same interactions are taking place simultaneously on the opposite side of apparatus 10 by the second set of actuator assemblies 226 and 228 as they interact with the forward and rear release members 114a and 114b.

As the leading end of forward recess 118 in side wall 86 slides past the rear actuator head 250, the biasing spring 246 pivots arm 234 in a clockwise direction thereby allowing head 250 to move down into recess 118 in front of release member 114c. In response to further forward movement of the cassette, the forward edge 220 of release member 114c engages the cam surface 270 of cam member 268. As best shown in FIG. 13, the relatively wide cam member 268 will not fit into notch 222 on release member 114c and therefore cam surface 270 rides up and over forward edge 220 causing the actuator head 250 to be deflected outwardly toward channel 194. This action causes the engaging surfaces 272 above and below cam 268 to ride up and over leading edge 220 so there is no coupling engagement between actuator head 250 and release member 114c. In this manner the forward latch release member 114c is able to bypass the rear actuator head 250 without causing movement of the release member 114c so that the interior latch member 146 remains in its latching position to hold the cassette sections in their second closed position. In response to further movement of the cassette forwardly into receptacle 160 the cam surface 270 rides up over the end of recess 218 to once again locate the flat forward face 256 of the rear actuator head 250 on the exterior surface of side wall 86 behind recess 118.

Although not shown in the drawing, the same action takes place on the opposite side of the cassette, the only difference being that the rear actuator head on this side also overrides the first closed position latch member 112a ahead of second closed position latch member 114a.

Cassette 18 is further moved forwardly into receptacle 18 whereupon the recess 118 having release member 114c therein approaches the forward actuator head 256 and the rear recess 120 having release member 114d therein approaches rear actuator head 250. As these recesses progress forwardly, forward actuator head 240 enters recess 118 and rear actuator head 250 enters rear recess 120 under the influence of their respective biasing springs 246 as best shown in FIG. 11.

As the cassette 18 is moved further forwardly, the cam member 262 on forward actuator head 240 slides into the complementary notch 222 on release member 114c and the rear cam member 268 on head 250 enters the complementary notch 224 on the rear release member 114d. Because the cam face 260 on forward actuator head 256 is not engaged by the forward edge 220 of latch release member 114c and the cam face 270 on rear actuator head 250 does not engage the leading edge 223 of the rear release member 114b, the forward and rear actuator heads 240 and 250 are not cammed outwardly but remain with their flat forward faces 256 in engagement with the bottom of recesses 118 and 120 thereby allowing the release members 114c and 114d to slide into engagement with the actuator engaging surfaces above and below their respective cams. As best shown in FIG. 10, the forward edge 220 of release member 114c engages the surfaces 264 on either side of cam member 262. The leading edge 223 of latch release member **114*d* similarly engages their release member engagement surfaces 272 above and below cam 268. At this point, the forward and rear actuator heads 240 and 250 serve as stops which prevent further forward movement of the latch release members 114*c* and 114*d*, respectively. When this happens, the cassette is almost to its fully inserted operative position. In response to the last increment of forward movement to locate the cassette at the fully inserted position, the latch release members 114*c* and 114*d* in effect are moved rearwardly in their recesses 118 and 120 to effect the movement of the forwardly biased latch members 146*c* and 146*d* from the latching position of FIG. 7 to the unlatching position of FIG. 8. Likewise, the latch members 146*a* and 146*b*** on the opposite side of the cassette 18 are also released. This unlatching action allows the base section 70 to pop up to its first closed position shown in FIG. 6 to facilitate the removal of the film unit 20 from cassette 18 through the forward opening 22.

As the cassette 18 reaches its fully inserted position, the trailing end of the cassette clears the depressed section 202 allowing it to move upwardly to its first or latching position behind cassette trailing end wall 102. Section 202 serves to releasably latch the cassette in its fully inserted position by counteracting a rearward reaction force on the cassette caused by the compression of the biasing springs associated with the four latch members 146 when the latch release members 114 are moved to their unlatching position.

Following the advancement of the coupled sheets 16 and 20 between the rollers of the processor, the empty cassette 18 may be removed by manually depressing section 202 and pulling the cassette out rearwardly through opening 156.

As the cassette is withdrawn, the forwardly facing inclined cam surfaces 258 on the forward and rear actuator heads 240 and 250 serve to ride the heads up and out of the recesses 118 and 120 thereby insuring that the heads 240 and 250 are properly deflected outwardly so as not to impede the rearward movement of cassette 18 from receptacle 160.

Because certain changes may be made in the disclosed photographic apparatus 10, embodying the present invention, without departing from the scope of the invention herein involved, it is intended that all matter contained in the above description and shown in the accompanying drawings shall be interpreted as illustrative and not in a limiting sense.

What is claimed is:

1. Photographic apparatus for use with a film processor for receiving a cassette holding an exposed film unit and including releasably latched means for applying pressure to the film unit to urge it against a surface within the cassette, for supporting the cassette at an operative position wherein a film withdrawal slot at a leading end of the cassette is adjacent an entry of the processor, and for unlatching the pressure applying means to substantially reduce the pressure on the film unit and thereby facilitate its movement over the surface as the film unit is advanced through the withdrawal slot into the processor entry, the cassette also being of the type including longitudinally spaced forward and rear pressure latch release members that are forwardly biased into a pressure latching position and upon actuation are adapted to be moved rearwardly therefrom to an unlatching position, the forward and rear release members each having a different configuration, said apparatus comprising:

a body;

means for attaching said body to the processor;

a longitudinally extending cassette receptacle formed on said body for receiving such a cassette advanced thereinto, leading end first, toward the processor entry and for supporting the cassette at said operative position; and forward and rear latch release actuating means for, respectively, engaging and actuating the forward and rear latch release members on the cassette, said forward and rear actuating means being longitudinally spaced along a path of travel followed by the forward and rear release members as the cassette is advanced into said receptacle so that the forward release member passes by said rear actuating means before it is in position to be engaged by said forward actuating means, said forward actuating means having a first configuration that is complementary to the configuration of the forward release member so as to become coupled thereto upon engagement and said rear actuating means having a second configuration that is complementary to the different configuration of the rear release member so as to become coupled thereto upon engagement but yet allowing engagement with the forward release as it passes by without becoming coupled thereto, said forward and rear actuating means being arranged so as to become coupled to the forward and rear release members, respectively, as the cassette approaches said operative position and thereafter effecting rearward movement of the forward and rear release members to the unlatching positions in response to further movement of the cassette toward said operative position.

2. The apparatus of claim 1 wherein the means for biasing the forward and rear release members forwardly into their latching positions operate, when the forward and rear release members are moved rearwardly to their unlatching positions, to provide a rearwardly directed reaction force on the cassette tending to urge it away from said operative position and said apparatus further includes means for engaging the cassette to releasably hold it in said operative position against the urging of said reaction force.

3. The apparatus of claim 2 wherein said body has an opening therein through which the cassette is inserted into and removed from said receptacle and said cassette engaging means includes at least one member mounted on said body for movement being a first position wherein said member is located in at least partial blocking relation to said opening and engages a trailing end wall of the cassette to releasably hold it at said operative position and a second position wherein said member unblocks said opening to permit entry and withdrawal of the cassette.

4. The apparatus of claim 3 further including means for biasing said member into said first position with a force that allows said member to be displaced to said second position, against said biasing force, by the weight of the forward end of the cassette resting on said member.

5. The apparatus of claim 1 wherein said forward and rear actuating means, respectively, substantially simultaneously engage and actuate said forward and rear release members.

6. The apparatus of claim 1 wherein the forward and rear release members are mounted, respectively, in forward and rear recesses in a side wall of the cassette and said forward and rear actuating means each include an actuator head that is mounted for movement toward and away from the side wall so that said actuator heads may enter into said recesses to engage the release members and may be retracted therefrom to permit withdrawal of the cassette from said receptacle.

7. The apparatus of claim 6 further including means for biasing said actuator heads into engagement with the cassette side wall and the recesses therein and said actuator heads include at least one cam surface thereon for engaging the structure of the side wall to effect the retraction of said actuator heads from said recesses in response to cassette movement as it is being withdrawn from said receptacle.

8. The apparatus of claim 1 wherein the forward release member includes a forward edge and a relatively narrow notch therein extending rearwardly from the forward edge, the differently configured rear release member includes a forward edge and a relatively wide notch therein extending rearwardly from that forward edge, said forward actuating means includes a displaceable forward actuating head having a first cam member that is dimensioned to fit into the narrow notch on the first release member and a coupling surface that engages the forward edge of the first release member when said first cam member is in the narrow notch, and said rear actuating means includes a displaceable rear actuating head having a second cam member that is dimensioned to fit into the wide notch on the rear release member, but is too wide to fit into narrow notch on the forward release member, and a coupling surface that engages the forward edge of the rear release member when the second cam member is located in the wider notch so that when the first release member approaches said rear actuator head its forward edge engages the second cam member which cannot enter the wider notch and said second cam member displaces said rear actuator head away from the first release member to prevent said coupling surface of said rear actuating head from engaging the forward edge of the first release member and thereby allowing the first release member to pass by said rear actuating head without becoming coupled thereto.

9. The apparatus of claim 8 further including means for biasing said forward and rear actuator heads into the path of travel followed by the forward and rear release members.

10. The apparatus of claim 1 wherein the cassette includes a base section and a cover section that are adapted to move away from one another when the forward and rear latch release members are actuated, said receptacle is formed in part by a pair of side rails on which a portion of the cover section rests when the cassette is supported at the operative position, and said apparatus further includes biasing means engageably with the cassette and tending to urge it upwardly off said side rails and a means engageable with the cassette for releasably holding the cassette down on said side rails against the urging of said biasing means.

11. The cassette of claim 1 wherein a major portion of said receptacle, adjacent the processor entry, is enclosed to light shield a path of travel of the exposed film unit from the leading end of the cassette to processing means within the processor.

* * * * *